United States Patent [19]

Steinz et al.

[11] Patent Number: 5,784,246
[45] Date of Patent: Jul. 21, 1998

[54] SAFETY SYSTEM COMPRISING MAGNETIC LOGIC CIRCUITS

[75] Inventors: Hendrik Christiaan Steinz, Hattem; Jan Nichlaas De Breet, Apeldoorn, both of Netherlands

[73] Assignee: GTI Industrial Automation, Inc., Netherlands

[21] Appl. No.: 571,849

[22] PCT Filed: Apr. 28, 1995

[86] PCT No.: PCT/NL95/00155

§ 371 Date: Dec. 27, 1995

§ 102(e) Date: Dec. 27, 1995

[87] PCT Pub. No.: WO95/30127

PCT Pub. Date: Nov. 9, 1995

[30] Foreign Application Priority Data

May 3, 1994 [NL] Netherlands ............................ 9400727

[51] Int. Cl.[6] ............................................. G01D 3/08
[52] U.S. Cl. ......................... 361/170; 307/326; 361/159
[58] Field of Search ............................. 361/170, 160, 361/159; 307/407, 412, 413, 414, 415, 326, 328

[56] References Cited

U.S. PATENT DOCUMENTS

| | | | |
|---|---|---|---|
| 3,200,382 | 8/1965 | Busch | 307/415 |
| 3,611,053 | 10/1971 | Rowell | 361/160 |
| 3,634,734 | 1/1972 | Scott | 361/159 |
| 3,974,425 | 8/1976 | Ueda et al. | 361/170 |
| 4,456,943 | 6/1984 | Judy | 361/160 |
| 4,873,606 | 10/1989 | Pannier | 361/160 |
| 4,897,561 | 1/1990 | Saigo et al. | 307/413 |
| 4,950,985 | 8/1990 | Voss et al. | 361/170 |
| 4,974,114 | 11/1990 | Kammerer | 361/159 |
| 5,054,599 | 10/1991 | Marcott | 361/159 |
| 5,343,994 | 9/1994 | Kyrtsos | 361/159 |

*Primary Examiner*—Fritz Fleming
*Attorney, Agent, or Firm*—Jones, Day, Reavis & Pogue

[57] ABSTRACT

A safety system comprises separate safety circuits connected to a process to be safeguarded, each of which safety circuits are coupled to a data acquisition circuit via a retroaction-free element, which takes care of it that in the event of a malfunction occurring on the input of the data acquisition circuit, this malfunction will not affect the reliability and operational safety of each of the separate safety circuits.

10 Claims, 1 Drawing Sheet

SAFETY SYSTEM COMPRISING MAGNETIC LOGIC CIRCUITS

BACKGROUND OF THE INVENTION

1. Field of the Invention

The invention relates to a safety system provided with separate safety circuits each comprising a semiconductor provided with a control electrode, in whose main path of current a circuit consisting of a coil, a diode and at least one magnetic core winding is incorporated, whereby the main current flows each time when a control pulse is supplied to said control electrode, which main current is interrupted contiguously thereto, as a consequence of which said coil produces a circuit current.

2. Description of Related Art Including Information Disclosed Under 37 CFR 1.97 and 1.98

A safety system of this type is known from NL-A-7314056.

The known safety system consists of a safety circuit, wherein a change of the magnetization state of a magnetic core will lead to the control pulse being produced, which control pulse causes a current to flow in the main path of current and the coil, which current is interrupted by the transistor upon termination of the control pulse. The coil will then produce an induction voltage such that the magnetic energy stored therein is released in the form of a circuit current through the diode and the magnetic core winding, which in turn energizes a next magnetic core.

The known safety system is highly insensitive to for example electromagnetic influences from outside, it is reliable and safe to operate, whereby the risk of a current which magnetizes the magnetic core, for example when system components exhibit value fluctuations, short-circuit or are interrupted, being produced spontaneously is extremely small. In order to be able to perform the safety function adequately, it is tested very frequently, for example every millisecond, whether the safety system is still functioning properly by generating a control pulse.

When safety processes, in particular multi-variable processes which are as inter alia used in the chemical industry, for example in cracking plants, on drilling platforms and the like, reliability and operational safety, not only of the installation itself, but also of the safety system, are literally matters of life and death, both for persons and for the environment. Multi-variable processes usually comprise a great many processes and process quantities, which are often connected in a complex manner, and as many parts, which may or may not be controllable, such as valves, regulators, pipes, filters, as well as a many sub-processes, which all require safety measures. Although the above safety system, which functions according to the rules of magnetic logic, is quite reliable, the safety system is becoming more and more extensive as the processes to be safeguarded are becoming more and more extensive, and with it the risk of errors being caused by the safety system itself. Under certain circumstances an incorrect picture of the status and the course of vital process and safety quantities may be given as a result of these errors. It will be apparent that it is unacceptable when the high degree of reliability of the safety system as a whole is affected in this manner.

SUMMARY OF THE INVENTION

The object of the present invention is therefore to reduce the risk of unnoticed errors occurring in the safety system, in particular when processing data which are of vital importance to safety.

In order to accomplish this objective the safety system according to the invention is characterized in that the safety circuits are each provided with a retroaction-free (reaction free) element, which is on the one hand connected to the main path of current of the semiconductor, and which is on the other hand connected to an input of a data acquisition circuit.

The advantage of the safety system according to the invention is that the effect of one class of errors, namely that class of errors where the inherent safety and reliability of the magnetic logic circuits are affected as a consequence of retroaction from (or interaction with) circuits arranged behind the magnetic logic circuit, has been recognized and eliminated. The characteristics as regards the reliability and availability of the safety system as a whole, which are of great importance for the safety function, will be retained and cannot be influenced by undesirable signals or error signals from the inputs of the data acquisition circuit.

In one embodiment of the safety system according to the invention the retroaction-free element is a metal film resistor having a very high degree of reliability.

In one preferred embodiment of the safety system according to the invention said metal film resistor is a vapor-deposited metal film resistor, which usually contains a metal oxide.

The advantage of a resistor of this type is that when the acquisition circuits exhibit a malfunction of a nature which might involve a risk of too large a current flowing through the metal film resistor, said current will cause the vapor-deposited metal film to melt, thus switching the current off. At that time the respective safety circuit and the input of the data acquisition circuit are electrically separated by an open circuit, so that the proper operation of the safety circuit is not affected by a malfunction of the associated acquisition circuit.

In another embodiment of the safety system according to the invention the retroaction-free element is a transformer.

The advantage of using said transformer as a retroaction-free element is that a complete galvanic separation between said safety circuit on the one hand and the input of the acquisition circuit on the other hand is achieved. Moreover, as a result of this an extra safety and blocking of direct current is obtained, which direct current might start to flow as a result of malfunctions in the input of the acquisition circuit in particular.

In another preferred embodiment of the safety system according to the invention the acquisition circuit is in the form of a data buffer, more in particular as a shift register. In the latter case said shift register is provided with inputs coupled to the separate safety circuits and with a serial output, as a result of which a parallel series conversion takes place in the data acquisition circuit. The result of this is that serial communication, for example by means of two usually twisted-together wires, is possible. This reduces the number of connections in the safety system according to the invention, which may thus be of simpler design.

In yet another preferred embodiment of the safety system according to the invention said data acquisition circuit is connected to a status/event registration system comprising a computer.

The advantage of this embodiment of the safety system according to the invention is that it is possible at all times not only to monitor and evaluate the status at any given moment, but that in addition to that the system makes it possible to review the course of the process in order to subject it to an error analysis, so as to be able to trace the cause of a particular malfunction quickly, especially with more extensive and more complex multi-variable processes.

BRIEF DESCRIPTION OF THE DRAWINGS

The invention and its further advantages will be discussed in more detail with reference to the accompanying drawing, wherein like numbers indicate like parts in the various Figures. In the drawing.

DETAILED DESCRIPTION OF THE PREFERRED EMBODIMENT(S)

Figure 1:
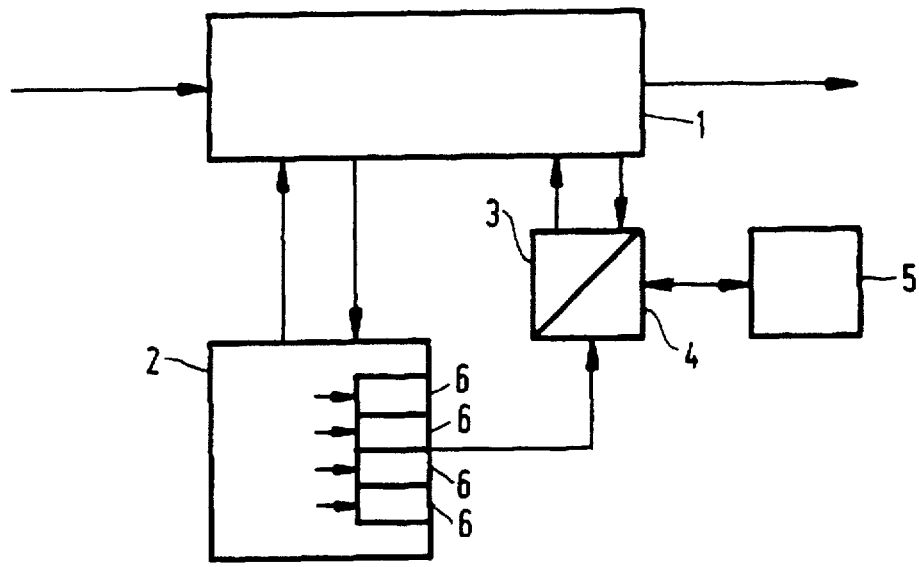
FIG. 1 shows a first embodiment of the safety system according to the invention.

FIG. 1 is a simplified schematic representation of a process 1, which is coupled to a safety system 2, with which a mutual exchange of information is possible. The safety system 2 includes emergency provisions for use in the event that a certain situation in the process 1 should make it necessary to turn off or stop of the process in whole or in part. The safety system 2 also determines the boundaries within which it is possible to control the process in a control system 3 coupled to the process 1. Connected to the safety system 2 is a corresponding monitoring system 4, which is in turn coupled to a status and possibly registration system 5, which, in addition to a computer and a display unit, will include memory storage means and printing means.

Figure 2:
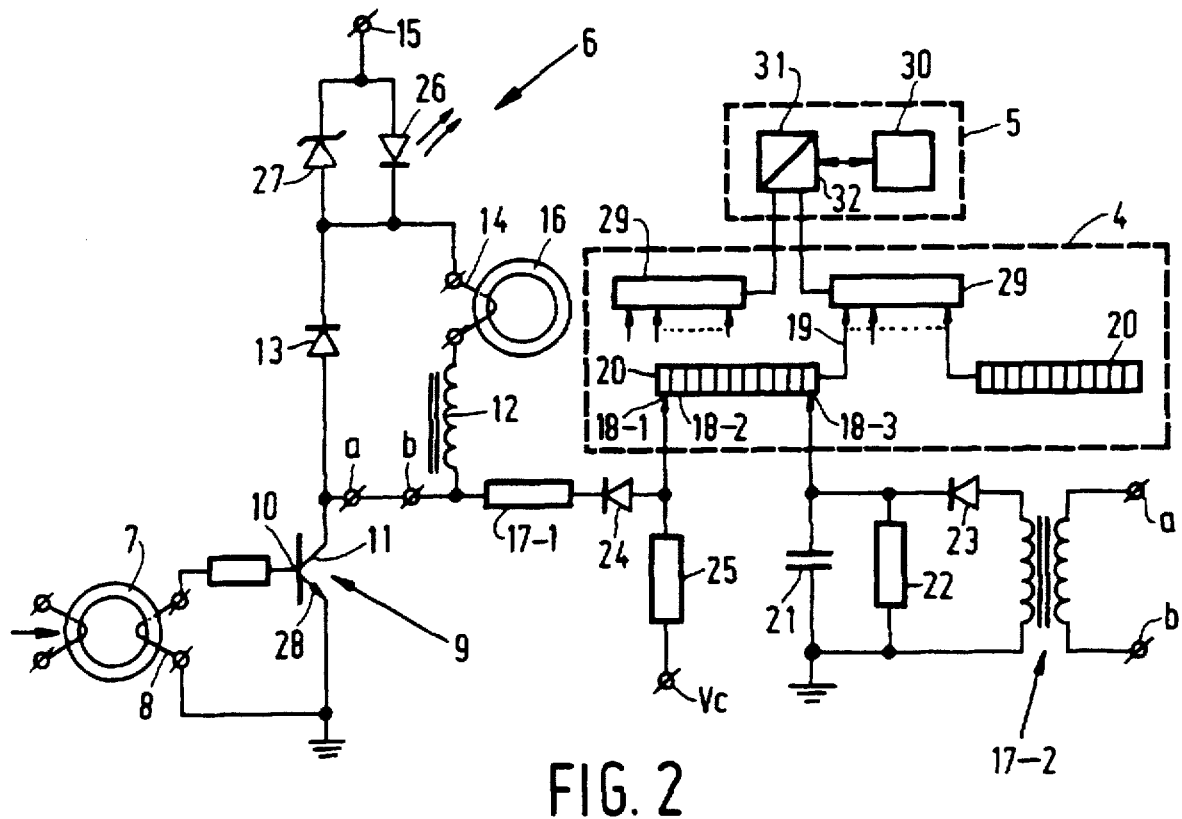
FIG. 2 shows a more detailed embodiment, wherein two versions of safety circuits for use in the safety system according to the invention are illustrated in more detail.

The safety system 2 includes a safety circuit 6 for each function or device to be safeguarded, a possible embodiment of said safety circuit being shown in the left-hand part of FIG. 2. Several functions indicated by means of an arrow in the block of safety system 2 can be safeguarded by means of separate safety circuits 6.

In the embodiment shown in FIG. 2 the safety circuit 6 includes a first magnetic memory core 7, which periodically receives a pulse-shaped signal from an interface circuit (not shown), which in turn is coupled to the function or device to be monitored. For reasons of simplicity the core 7 is only provided with one other winding 8 in the drawing, via which a base resistor is connected to the base-emitter junction 10, 28 of a transistor 9. The other windings and wires for influencing the direction of magnetization by means of an electric current are not shown. The base 10 of the semiconductor element in the form of a transistor functions as the control electrode of the semiconductor. The semiconductor 9, which is of the NPN-type in the illustrated embodiment, has a main path of current formed by the collector emitter chain 11, 28 of semiconductor 9. In the illustrated embodiment a circuit provided with a coil 12, a diode 13 and at least one magnetic core winding 14 is connected to the collector 11 in the main path of current. The winding 14 is magnetically coupled to further windings (not shown), which are used in the safety system 2 for safety purposes. The elements 12, 13, 14 are arranged and connected in such a manner that whenever a control pulse is periodically supplied to the semiconductor 9, the semiconductor will conduct temporarily and a current will flow through the main path of current, via a supply terminal 15, and through coil 12, until the semiconductor 9 stops conducting upon termination of the control pulse and the coil 12 causes the magnetic energy built up therein to decrease. An induction current will thereby flow through the appropriately connected diode 13 and the winding 14, which influences the magnetization of the magnetic core 16 coupled thereto in a manner already explained above. In addition to a very high degree of reliability, in the sense that when the direction of magnetization of the core 7 is influenced, also the direction of magnetization of the core 16 is influenced, the latter direction of magnetization is furthermore only influenced when this is desired. In other words, the short-circuiting of or, on the contrary, the formation of an open connection at the location of the various components in the circuit 6, does not result in the direction of magnetization of the core 16 being influenced. It is important that these characteristics are retained.

The monitoring system 4 is connected with the safety circuit 6 via a retroaction-free element 17.

In the illustrated embodiment the monitoring system 4 possesses a data buffer in the form of a data acquisition circuit, which is illustrated as a shift register 20 provided with inputs 18 and a serial output 19. The output 19 is connected to the status/event registration system 5, while each of the inputs 18-1, 18-2, 18-3 . . . are coupled to a retroaction-free element. FIG.2 shows input 18-1 coupled to the retroaction-free element 17-1, said element being a metal film resistor, in particular a vapor-deposited, metal oxide-containing metal film resistor. An advantageous feature of resistors of this type is that when the current flowing through it becomes too large, for example as a consequence of the fact that the voltage carried by input 18-1 is too high or too low as a consequence of a malfunction, the element 17-1 will interrupt itself and cause an open connection between the safety circuit 6 and the monitoring system to be formed, which does not affect the advantageous characteristics of the safety circuit 6.

Another possible embodiment of the retroaction-free element 17 is made up of the transformer 17-2 coupled to input 18-3. It is formed by imagining connections a and b of the transformer 17-2 at the location of the connection a-b, instead of the metal film resistor 17-1. This will not affect the operation of the safety circuit 6 and its inherent reliability. In addition to that the transformer 17-2 provides a galvanic separation between the safety circuit 6 and the input 18 of the shift register 20.

With regard to the functioning of in particular the retroaction-free element 17-1 in the illustrated embodiment of the safety circuit 6, it may be noted that during the time that the semiconductor 9 is conducting, a downward (negative) pulse is clocked into the shift register 20, while a positive pulse produced by the operation of a rectifier circuit 21, 22, 23 is directed to the shift register when the transformer 17-2 is used. Of course the input 18 on one of the two versions will be adapted. When each of the safety circuits 6 connected to each of the inputs 18-1, 18-2 . . . is activated, the values then present on the inputs 18 are latched by means of a signal pulse in a manner well known in the art which is supplied to the shift register 20, and which is made available to the registration system 5 in a serial manner, via the output 19, contiguous thereto. It will be apparent that in multivariable processes, in which a few thousand functions are to be monitored, several shift registers will successively transfer information to the system 5, where not only the status of the respective system may be monitored, but also the course of the various events may be stored for later usage for the purpose of error analysis.

A diode 24 and a resistor 25 connected to a supply voltage $V_c$ may be incorporated between in particular the metal film resistor 17-1 and the input 18-1, in order to maintain the voltage $V_c$ on the input 18-1 during the absence of a control pulse on control input 10. A malfunction (open circuit or short-circuit) in the diode 24 or the resistor 25 cannot affect the correct operation of the circuit 6.

A parallel circuit of a LED 26 and a reliable Zener diode 27 may be connected to the circuit 12, 13, 14, if desired, in order to provide an optical indication through said LED with regard to the correct operation of the safety circuit 6. The Zener diode 27 will take over the power supply function of the safety circuit 6 in the event of the LED 26 forming an open circuit during a malfunction.

Of course it will possible to use variants to that which is described above. Instead of being replaced by an NPN transistor the semiconductor 9 may thus also be replaced by a PNP transistor with an adjusted control pulse form and polarity of the supply voltage. Also other active semiconductors or multi-layer semiconductors provided with a control electrode may be used, such as thyristors, triacs and the like. The specific configuration of the circuit 12, 13, 14 may for example be changed by connecting the diode 13 and the winding 14, connected in series, in parallel to the coil 12. The polarity of the diode 13 is always such that in combination with the self-induction voltage generated by the coil 12 a current will keep flowing in the circuit until the moment when the magnetic energy in the coil has been reduced to zero. In order to be safe also in case of an undesirable permanent conduction of short-circuit of the semiconductor 9, a capacitor (not shown) may be placed between the emitter 28 of the semiconductor 9 and the supply terminal 15, said capacitor being supplied via a resistor (likewise not shown), which is connected to the supply voltage. Several magnetic cores comprising windings which are each connected in series may be incorporated in the circuit 12, 13, 14. Of course it would be possible for the transformer 17-2 to be connected to the emitter 28, if desired.

The data acquisition circuit 20 may be incorporated together with several similar circuits, in a larger communicating monitoring system 5 which is connected to the status/event registration system. A monitoring system of this type will for example comprise several multiplexers 29, each connected to circuits 20, which are connected to a microprocessor 31 provided with memory facilities 30, said microprocessor forming part of the status-event registration system 5. In this manner a complete safety system may be composed, by means of which several thousands of process status data may be stored, checked and processed into complete lists. By only selecting, by sorting means 32, changes in the process status data for storage in the memory facilities 30, which selection might already take place at the multiplexers 29, if desired, in order to reduce the amount of internal communication within the system, the required amount of memory capacity is reduced. The storage of the nature and the time of an alteration in the process status data will result in a less extensive memory facility 30. Of course also the necessary output, display and printing facilities will be available in order to be able to make an adequate analysis of a series of events or a certain condition/status of the process, so as to be able to interfere in the process in the correct and safest possible manner, if necessary.

The corresponding structures, materials, acts, and equivalents of all means or step plus function elements in the claims below are intended to include any structure, material, or act for performing the function in combination with other claimed elements as specifically claimed.

We claim:

1. A safety system provided with a plurality of separate safety circuits each coupled to the other and each comprising a semiconductor provided with a control electrode in whose main path of current a circuit consisting of a coil, a diode, and at least one magnetic core winding is incorporated, whereby the current flows in the main path each time a control pulse is supplied to the control electrode, which main current is interrupted upon termination of said control pulse as a consequence of which said coil produces a circuit current comprising:

a reaction-free element in each safety circuit connected in a current path between the main path of current of the semiconductor and the input of a data acquisition circuit to electrically isolate said safety circuit from said data acquisition circuit if and when a system malfunction causes excess current to flow in said circuit path between the semiconductor and the data acquisition circuit thereby preventing interference with proper operation of the safety circuit by the data acquisition circuit.

2. A safety system according to claim 1 comprising:

a microcomputer coupled to several data acquisition circuits; and memory facilities in said microcomputer for storage of process status data from the data acquisition circuits.

3. A safety system according to claim 2, characterized in that one or more multiplexers are connected between said data acquisition circuits and said microcomputer for the processing of several thousands of process status data.

4. A safety system according to claim 2 characterized in that said microcomputer includes sorting means for storing into said memory facilities the time and an indication as to the nature of changes in the process status data.

5. A safety system according to claim 1 characterized in that said reaction-free element is a metal film resistor.

6. A safety system according to claim 5 characterized in that said metal film resistor is a vapour-deposited metal film resistor.

7. A safety system according to claim 5, characterized in that said metal film resistor contains a metal oxide.

8. A safety system according to claim 1 characterized in that said reaction-free element is a transformer.

9. A safety system according to claim 1 characterized in that said data acquisition circuit is a data buffer.

10. A safety system according to claim 8 characterized in that said data acquisition circuit is of a shift register having inputs coupled to the separate safety circuits and having a serial output.

* * * * *